United States Patent [19]

Floessel

[11] 4,296,271
[45] Oct. 20, 1981

[54] GAS INSULATED HIGH VOLTAGE LINE AND METHOD OF ASSEMBLING SAME

[75] Inventor: Carl D. Floessel, Fislisbach, Switzerland

[73] Assignee: BBC Brown, Boveri & Company Limited, Baden, Switzerland

[21] Appl. No.: 136,350

[22] Filed: Apr. 1, 1980

[30] Foreign Application Priority Data

Apr. 9, 1979 [CH] Switzerland ............................ 3355/79

[51] Int. Cl.³ .................... H01B 9/04; H01B 13/20; H02G 5/06
[52] U.S. Cl. ............................ 174/28; 29/241; 29/433; 29/745; 29/828; 174/99 B
[58] Field of Search ............... 174/10, 16 B, 27, 28, 174/99 R, 99 B, 99 E, 148, 149 B; 29/825, 828, 433

[56] References Cited

U.S. PATENT DOCUMENTS 2,428,051 9/1947 Touraton ............................. 174/28
3,739,074 6/1973 Floessel ............................. 174/28
3,786,174 1/1974 Floessel ............................. 174/28

FOREIGN PATENT DOCUMENTS 1200923 7/1959 France ............................. 174/99 B

*Primary Examiner*—Laramie E. Askin
*Attorney, Agent, or Firm*—Burns, Doane, Swecker & Mathis

[57] ABSTRACT

A gas insulated, high-voltage electric line, as well as a method and apparatus for assembling the high-voltage line, is disclosed. The high-voltage line includes a pipe jacket as well as a conductor centrally arranged within the pipe jacket. A carrier ring encircles the conductor at each of a plurality of stations along a longitudinal axis of the pipe jacket. Each carrier ring carries a plurality of radially directed insulators. Interposed between each insulator and its respective carrier ring is a spring which urges the insulator radially outwardly toward, and into engagement with, the inner surface of the pipe jacket.

6 Claims, 6 Drawing Figures

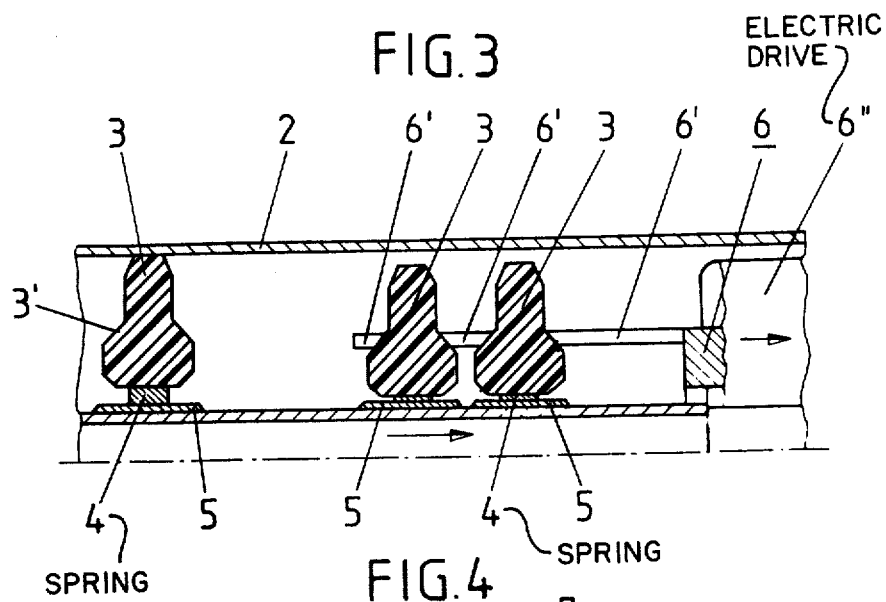
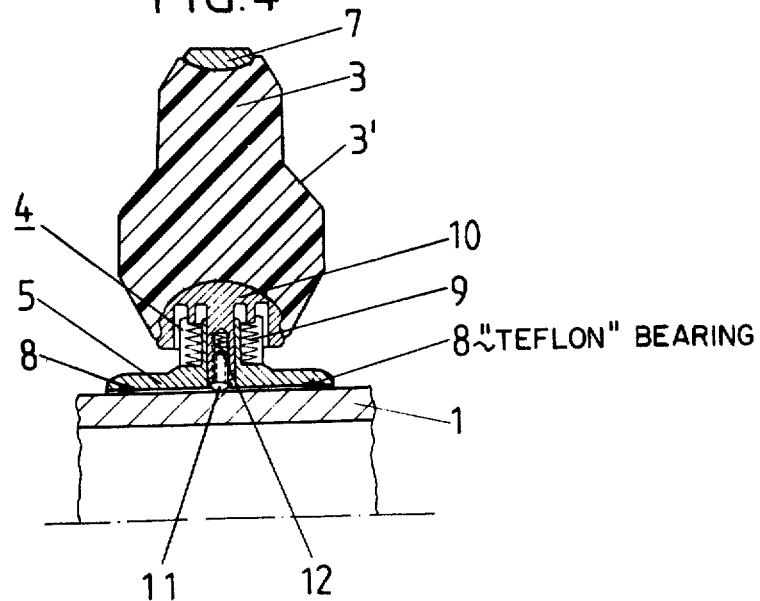

GAS INSULATED HIGH VOLTAGE LINE AND METHOD OF ASSEMBLING SAME

BACKGROUND AND SUMMARY OF THE PRESENT INVENTION

The invention disclosed herein pertains generally to gas insulated, high-voltage electric lines and more particularly to arrangements for insulating high-voltage conductors within a gas-filled pipe jacket.

U.S. Pat. No. 2,428,051 discloses a high-voltage line wherein a conductor is arranged within a pipe jacket and is centrally supported within the pipe jacket by three radially directed insulators, all of which insulators lie in the same plane. The insulators are bolted to the conductor. The end of each insulator facing an inner wall of the pipe jacket carries a spring-like element for holding the insulators at their positions within the pipe jacket. When the insulators, together with the conductor, are inserted into the pipe jacket, friction between the ends of the insulators and the pipe jacket results in metal particles or chips being rubbed off the pipe jacket. These undesirable chips remain inside the pipe jacket and are almost impossible to remove.

The published German patent application No. 21 47 787 (corresponding to U.S. Pat. No. 3,786,174) discloses a high-voltage line wherein a conductor is arranged within a pipe jacket and held in place by three radially directed insulators. Two of the insulators are rigidly connected to an insulating sleeve which encircles the conductor, while the third insulator is in the form of an insulating leg whose radial extent can be shortened by pressing against a spring. The conductor together with the insulators is inserted into the pipe jacket by means of a carriage assembly. The carriage assembly holds the insulating leg at a shortened radial position so that there is no contact between the insulators and the pipe jacket during the insertion of the conductor and the insulators into the interior of the pipe jacket. When the proper axial position is reached within the pipe jacket, the carriage assembly is pulled out, the spring of the shortened insulator leg presses the leg against the inner surface of the pipe jacket, thereby fixing the position of the conductor and the insulators within the pipe jacket. However, this arrangement is relatively complicated and requires the repeated use of the carriage assembly for positioning each set of insulators.

Accordingly, a primary object of the present invention is to provide an improved, gas insulated, high-voltage line which includes a conductor, encircled by one or more sets of radially directed insulators, which conductor is centrally arranged within a pipe jacket, and which conductor and insulators may be relatively easily inserted into the pipe jacket without friction between the insulators and the pipe jacket and without abrading metal chips from an inner wall of the pipe jacket.

A further object of the present invention is to provide an improved, gas insulated, high-voltage line which makes allowance for a radial, thermal expansion of the centrally arranged conductor.

Yet another object of the present invention is to provide a method and a tool for readily inserting the conductor and one or more sets of radially directed insulators into the interior of the pipe jacket.

Yet a further object of the present invention is to provide an improved, gas insulated, high-voltage line which includes a conductor, encircled by one or more sets of radially directed insulators, which conductor is centrally arranged within a pipe jacket, as well as a tool for easily inserting the conductor and insulators into the interior of the pipe jacket, which high-voltage line and tool are relatively simple.

A gas insulated, high-voltage electric line, according to the present invention, includes a cylindrical conductor which is centrally arranged within a pipe jacket. A plurality of insulators is arranged about the periphery of the conductor, and a spring-like element is arranged between each insulator and the conductor. The spring-like elements urge the insulators radially outwardly toward, and into contact with, an inner surface of the pipe jacket. The insulators are movable, relative to the pipe jacket, along a longitudinal axis of the pipe jacket.

A method for assembling the high-voltage electric line, according to the present invention, includes the step of mounting at least two sets of radially directed insulators onto the conductor of the high-voltage line. Each of the insulators includes a resilient member interposed between the conductor and the insulator. All of the insulators are simultaneously urged radially downwardly toward the conductor to produce a clearance between an outer end of each of the insulators and an inner surface of the pipe jacket of the high-voltage line. The conductor and the insulators are then moved into an interior of the pipe jacket until the first set of insulators has been moved to a desired axial location. All of the insulators are released to permit the resilient members interposed between the conductor and the first set of insulators to urge the first set of insulators radially outwardly into engagement with the inner surface of the pipe jacket. The second set of insulators is then engaged and urged radially downwardly toward the conductor. Then the conductor and the second set of insulators are moved further into the interior of the pipe jacket until the second set of insulators has been moved to a desired axial location. The second set of insulators is then released to permit the resilient members interposed between the conductor and the second set of insulators to urge the second set of insulators radially outwardly into engagement with the inner surface of the pipe jacket.

An apparatus, referred to herein as a clamping chuck, for inserting a conductor having at least one row of insulators mounted on the conductor into an interior of a pipe jacket, according to the present invention, includes at least one longitudinal member having jaws which may engage and urge the at least one row of insulators radially inwardly toward the conductor.

BRIEF DESCRIPTION OF THE DRAWINGS

A preferred embodiment of apparatus according to the present invention is described with reference to the accompanying drawings wherein like members bear like reference numerals, and wherein:

FIG. 3 is a partial longitudinal section of the high-voltage line shown in FIGS. 1 and 2, illustrating the process of assembling the high-voltage line;

FIG. 4 is a cross-sectional view of a preferred embodiment of an insulator, according to the present invention;

DETAILED DESCRIPTION OF THE PREFERRED EMBODIMENT

Figure 1:
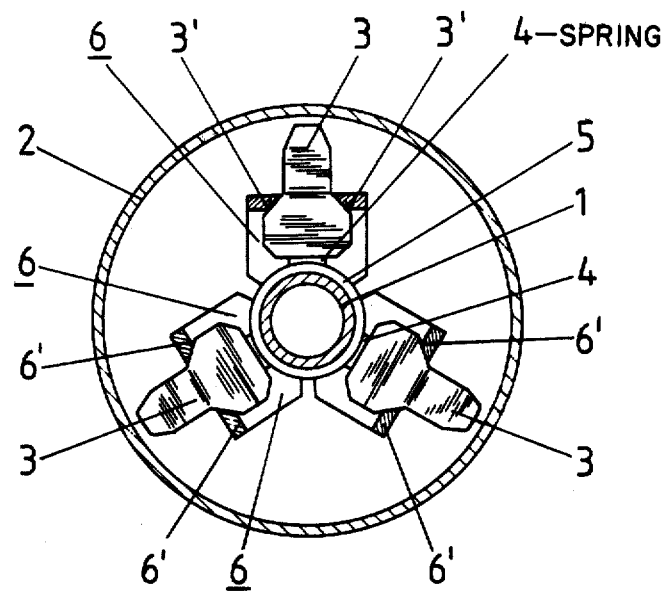
FIG. 1 is a cross-sectional view of a high-voltage line, according to the present invention, wherein the clamping chuck of the present invention has engaged the contact surfaces of the insulators mounted on a carrier ring encircling the conductor of the present invention, depressing the springs arranged between the insulators and the carrier ring.

With reference to FIG. 1, a gas insulated, high-voltage electric line, according to the present invention, includes a cylindrical conductor 1 arranged within the interior of a pipe jacket 2. A carrier ring 5, whose length is much less than that of the conductor 2, encircles the conductor 2. Such a carrier ring encircles the conductor 2 at a plurality of stations along a longitudinal axis of the conductor 2 (see FIG. 3). Three radially directed insulators 3 are mounted on each carrier ring 5, and a spring-like element 4 is arranged between each insulator and the carrier ring on which it is mounted. The insulators 3 are substantially identical to one another and are substantially equiangularly spaced about a longitudinal axis of the conductor 2. Each insulator 3 includes inclined contact surfaces 3', which contact surfaces may be engaged to depress the spring-like elements 4, thereby providing a clearance between the insulators 3 and an inner surface of the pipe jacket 2.

A tool, according to the present invention, for positioning the insulators of the present invention within the pipe jacket 2, at prescribed intervals along the length of the conductor 1, includes a three-pronged clamping chuck 6. The clamping chuck 6 includes three parallel, equiangularly spaced longitudinal members. Each longitudinal member includes fork-like jaws 6' whose end faces substantially conform to the contact surfaces 3' of the insulators 3. The clamping chuck 6 is sized so that after being slid onto the conductor 2, the fork-like jaws 6' may be used to engage the contact surfaces 3' of the insulators 3 to thereby depress the spring-like elements 4. Because the contraction of the spring-like elements 4 results in a clearance between the insulators 3 and the inner surface of the pipe jacket 2, it follows that the clamping chuck may be used to easily insert the conductor 2 and the insulators 3 into the interior of the pipe jacket 2.

By using the clamping chuck 6 to depress the contact surfaces 3' of the insulators 3, the conductor 1 can be moved readily in an axial direction of the high-voltage line within the pipe jacket 2 without damaging the pipe jacket 2 and/or the insulators 3. No scrapings will be produced and an axial movement inside the pipe jacket 2 can be carried out with relatively little effort.

Figure 2:
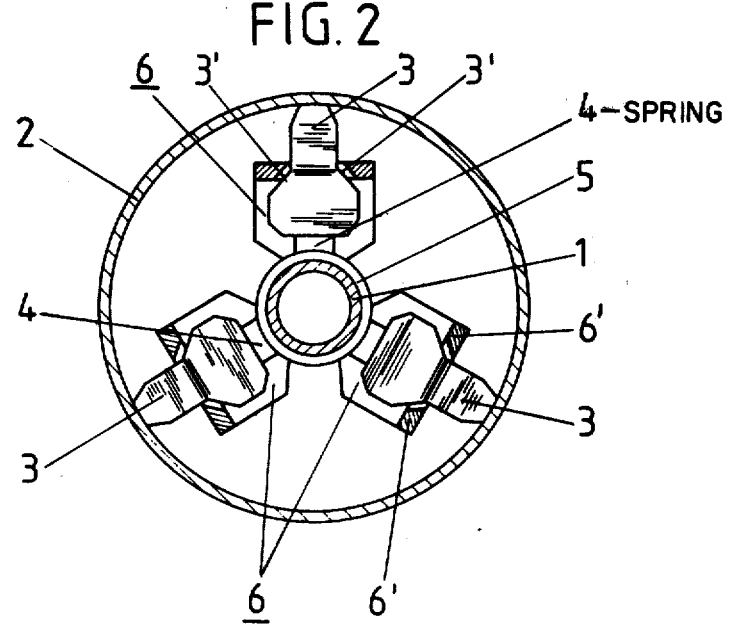
FIG. 2 is a view similar to FIG. 1, but with the clamping chuck out of engagement with the contact surfaces of the insulators.

With reference to FIG. 2, once the conductor 2 and the insulators 3 have been inserted into the pipe jacket 2, and the insulators 3 positioned at the desired axial location, the fork-shaped jaws 6' of the clamping chuck 6 may be disengaged from the contact areas 3' of the insulators 3 to allow the spring-like elements 4 to urge the insulators radially outwardly. The spring-like elements 4 thus press the insulators 3 onto the internal surface of the pipe jacket 2, fixing the axial position of the insulators 3 relative to the pipe jacket 2.

FIG. 3 illustrates the process of assembling the high-voltage line, according to the present invention, with the clamping chuck, according to the present invention. As shown in FIG. 3, three sets of radially directed insulators 3 are being used to suspend the conductor 1 within the pipe jacket 2. FIG. 3 also illustrates the cross-sections of the carrier rings 5 and the spring-like elements 4, which spring-like elements connect the insulators 3 to the carrier rings 5. Also shown are the contact areas 3' of the insulators 3. It is to be noted that the insulators 3 are symmetrical with respect to rotation. FIG. 3 also shows cross-sections of the fork-shaped jaw 6' of the clamping chuck 6, and a cross-section of an electric drive 6" which powers the clamping chuck 6.

With reference to FIG. 3, the process of assembling the high-voltage line, according to the present invention, begins with the step of connecting the insulators 3 to the carrier rings 5 with the spring-like elements 4. The carrier rings 5 are then pushed onto one end of the conductor 1 and compressed with the fork-shaped jaws 6' of the clamping chuck 6. FIG. 3 shows only the center and right-most set of insulators 3 being compressed by the clamping chuck 6.

The next step in the assembly process is to move the insulators 3 and the conductor 1 with the clamping chuck 6 from left to right, in the direction of the arrow shown in FIG. 3, into the pipe jacket 2. When the left-most set of insulators 3 has reached its proper position in the pipe jacket 2, the clamping chuck 6 is released, with the result that the left-most set of insulators is securely held in place within the pipe jacket 2 by the spring force exerted by the spring-like elements 4. The clamping chuck 6, still in its released state, is then advanced to the right over a distance corresponding to the length of a carrier ring 5. At the following compression of the clamping chuck 6 only the next two sets of insulators 3, located at the center and to the right, are compressed by the jaws 6' of the clamping chuck 6 and moved further to the right by the clamping chuck while the left-most set of insulator 3 remain in a fixed position within the pipe jacket 2. It is to be noted that because the jaws 6' of the clamping chuck are no longer pressing down upon the left-most set of insulators 3, frictional contact between the carrier ring 5 of the left-most set of insulators and the conductor 1 is substantially reduced. Thus the conductor 1 can be pulled with ease through the carrier ring 5 of the left-most set of the insulators 3 as the clamping chuck 6 moves the two remaining sets of insulators 3 further to the right, the resulting position of the insulators being shown in FIG. 3. The steps outlined above are now repeated for the center and right-most set of insulators 3 in order to properly position these insulators within the pipe jacket 2.

With reference to FIG. 4, a preferred embodiment of an insulator, spring-like element, and carrier ring, according to the present invention, includes an insulator 3 manufactured from an epoxy resin sold under the trademark "Araldit". The insulator 3 includes a contact element 7 at the top of the insulator 3, made preferably from aluminum.

A preferred embodiment of a carrier ring 5, according to the present invention, is manufactured from pressure-cast aluminum. Interposed between the carrier ring 5 and a conductor 1 on which the carrier ring is mounted, are two rings 8 which serve as friction bearings and which are made, for example, from polytetrafluoroethylene.

Springy bodies or members 9, which urge the insulator 3 radially outwardly, are supported or mounted within a funnel fitting guide unit 10 for the springy bodies 9. The funnel fitting guide unit 10 is arranged near the bottom of the insulator 3, adjacent the carrier ring 5. The funnel fitting guide unit 10 may be made, for example, from aluminum and includes a sliding guide arrangement to maintain a substantially radial orientation for the insulator 3 with respect to the carrier ring 5.

A contact 11 is arranged within a bore at the base of the guide unit 10. The contact 11 projects from the bore at the base of the guide unit 10 through an opening in the carrier ring 5 into contact with the conductor 1. A spring 12 within the bore in the funnel fitting guide unit 10 urges the contact 11 radially downwardly toward the conductor 1.

The conductor 1, as well as the pipe jacket of the high-voltage line, according to the present invention, may be manufactured from aluminum tubing.

Figure 5A:
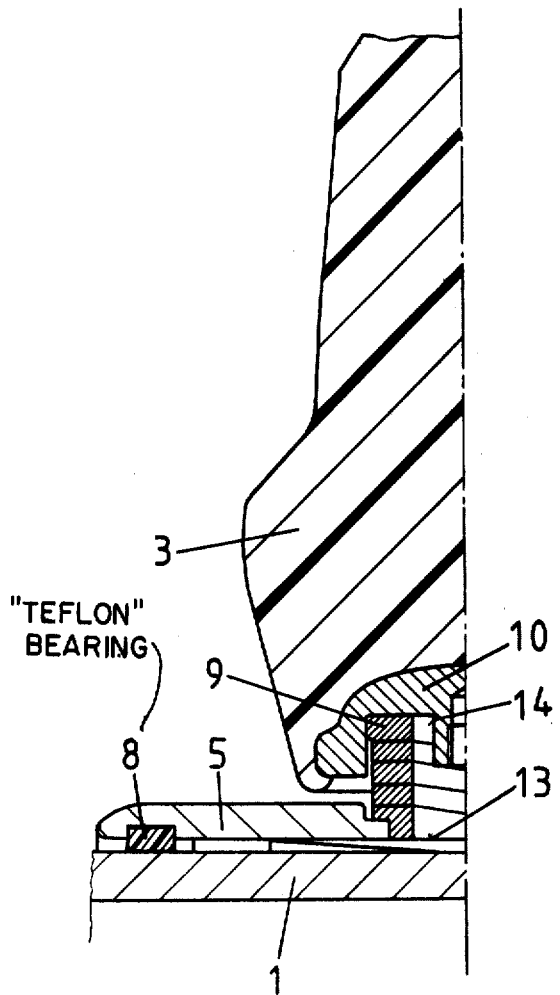
FIG. 5a is a plan view of a longitudinal section through the high-voltage conductor according to the invention in the area of a part of the springy element before assembly; and, FIG. 5b is a corresponding plan view after assembly.
Figure 5B:
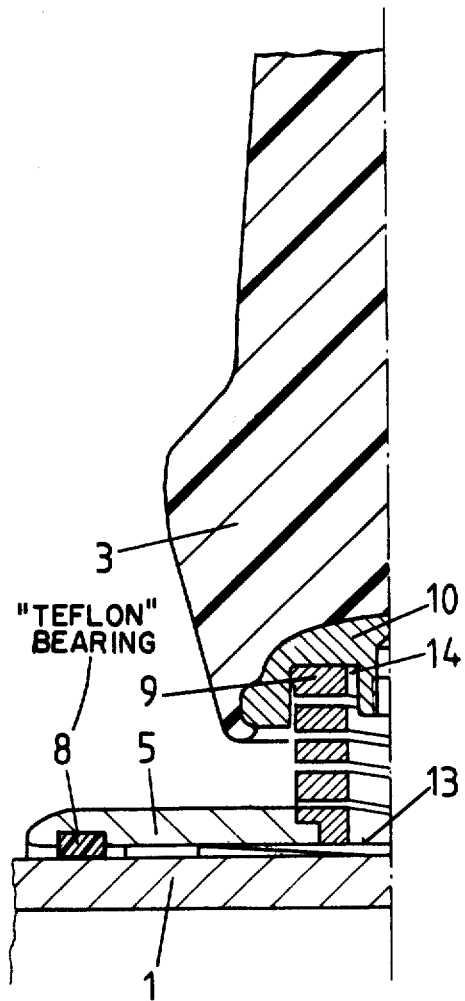

In FIGS. 5a and 5b, each insulator is supported by a springy element constructed as a bend-resistant separator 9 and provided on the inside with friction bearing rings 8. The separators are bend-resistant in that the insulator 3 has a tendency to maintain a generally radial orientation with respect to the carrier ring 5. The separator 9 is attached at either end (i.e., the front ends) in recesses 13, 14 of the bracing or carrier ring 5 and of the funnel fitting guide member 10 and is constructed as a helicoid rectangular spring.

In the assembly of the inside conductor 1 and the insulators 3, the insulators which are radially arranged around every bracing or carrier ring 5 are pressed inward by the clamping chuck 6 in a radial direction against the force of the springy separators 9 and can now be inserted into the jacket pipe (FIG. 5a). As soon as the insulators 3 belonging to a bracing ring 5 have reached the desired position in the jacket pipe, the clamping chuck 6 is released and the insulators are locked by the force of the herewith released separators 9 between the jacket pipe and the bracing ring 5 or inside conductor 1, respectively (FIG. 5b). In this case, it is advantageous for the springy separators to be constructed as bend-resistant since, in this way, it is possible to do without an additional guide for the insulators 3 (see for example FIG. 3) moved in a radial direction when stressing or unstressing. Accordingly, the omission of sliding guides reliably avoids any undesired jamming of the guide possibly appearing when stressing or unstressing the insulators 3.

The present invention is advantageous because the conductor and the associated insulators may be relatively easily inserted into the interior of the pipe jacket with the clamping chuck without frictional contact between the insulators and the inner surface of the pipe jacket. Thus, damage to the insulators may be avoided and particles will not be scraped off the inner surface of the pipe jacket.

The present invention is also advantageous because the conductor of the high-voltage line, according to the present invention, may undergo a relatively unimpeded radial thermal expansion.

Yet another advantage of the present invention is that frictional forces between the conductor and the carrier rings are reduced.

Yet a further advantage of the present invention is that a potential equalization is achieved between the conductor and the springs, by the use of the contacts arranged between the conductor and the insulators, according to the present invention.

Still another advantage of the present invention is that the clamping chuck can be used to simultaneously engage and position more than one set of insulators mounted on carrier rings on the conductor, at successive locations along the length of the pipe jacket.

Still yet another advantage of the present invention is that the forklike jaws of the clamping chuck provide the necessary support for the insulators engaged by the clamping chuck, making it unnecessary to give the insulators an unusual or complicated shape.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A gas insulated, high-voltage electric line, comprising:
    a pipe jacket having an inner surface;
    a conductor centrally arranged within the pipe jacket;
    a plurality of insulators arranged about the periphery of said conductor; and
    spring means, arranged between said insulators and said conductor, for urging each of said insulators radially outwardly toward, and into contact with, said inner surface of said pipe jacket, said spring means including
    at least one carrier ring encircling said conductor, on which carrier ring said insulators are mounted, an inner diameter of which carrier ring is at least as large as an outer diameter of said conductor; and
    a plurality of resilient, spring-like elements, each of which elements is interposed between said conductor and one of said insulators; and
    said insulators being movable relative to said pipe jacket along a longitudinal axis of said pipe jacket.

2. The gas insulated, high-voltage electric line according to claim 1, wherein said at least one carrier ring includes at least one friction bearing arranged between an inner surface of said at least one carrier ring and an outer surface of said conductor.

3. The gas insulated, high-voltage electric line according to claim 1, wherein said spring means includes means for producing a potential equalization between said conductor and said spring means, and wherein each of said insulators includes a contact arranged at an outer end thereof.

4. The gas insulated, high-voltage line as defined in claim 1, wherein said spring means comprises a bend-resistant separator, said bend-resistant separator being connected at a first end to one of the insulators and at a second end to the carrier ring.

5. The gas insulated, high-voltage line as defined in claim 4, wherein the bend-resistant separator includes a helicoid rectangular spring and is retained both in a recess of the carrier ring and in a funnel fitting guide member connected with the said insulator.

6. A method for assembling a gas insulated, high-voltage electric line, comprising the steps of:
    mounting at least first and second sets of radially directed insulators onto a conductor, each of said insulators including a resilient member interposed between the conductor and the insulator;

simultaneously urging all of the insulators mounted on the conductor radially downwardly toward said conductor to produce a clearance between an outer end of each of said insulators and an inner surface of a pipe jacket;

moving said conductor and said at least first and second sets of insulators into an interior of said pipe jacket;

releasing all of the insulators when the first set of insulators has been moved to a first location to permit the resilient members interposed between the conductor and the first set of insulators to urge the first set of insulators radially outwardly into engagement with the inner surface of said pipe jacket;

simultaneously engaging and urging all of the insulators of the second set of insulators radially downwardly toward said conductor to produce a clearance between an outer end of each of said second set of insulators and the inner surface of said pipe jacket;

moving said conductor and said second set of insulators further into the interior of said pipe jacket; and releasing all of the insulators of the second set of insulators when the second set of insulators has been moved to a second location to permit the resilient members interposed between the conductor and the second set of insulators to urge the second set of insulators radially outwardly into engagement with the inner surface of said pipe jacket.

* * * * *